Dec. 19, 1939.  P. E. DOUBLE  2,183,641
METHOD OF ATTACHING CLINCH NUTS
Original Filed May 26, 1936
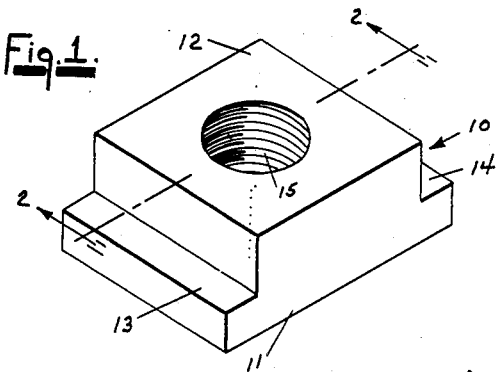
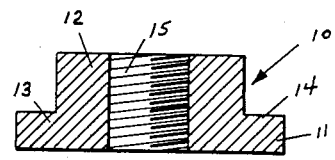
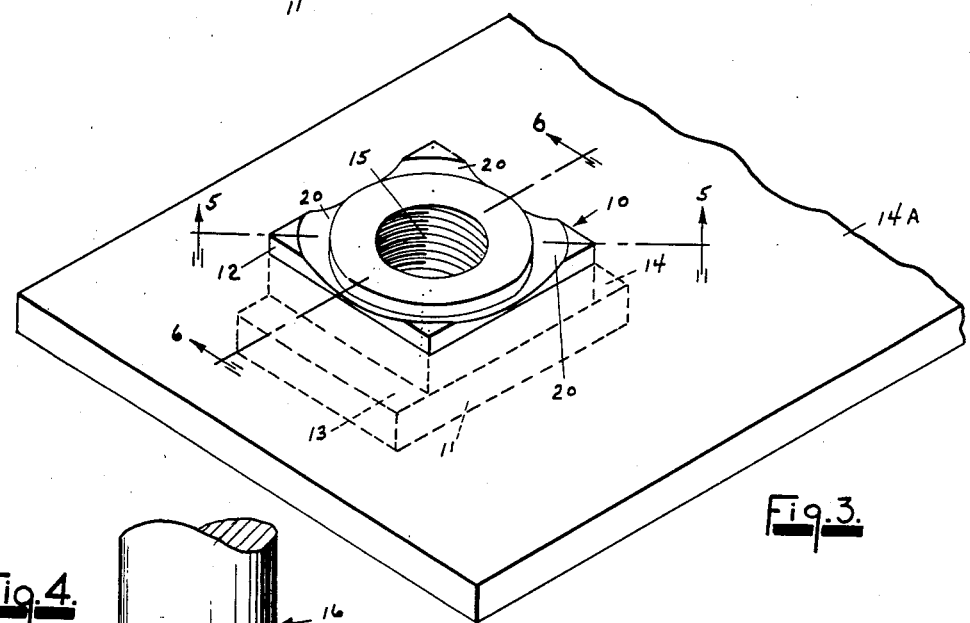
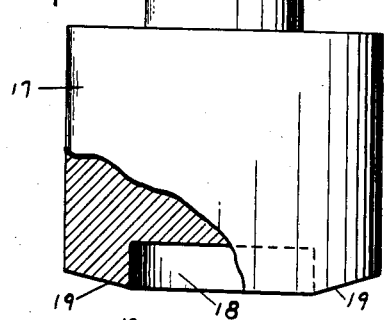
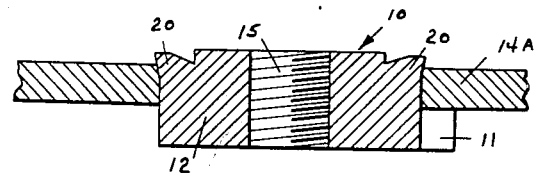
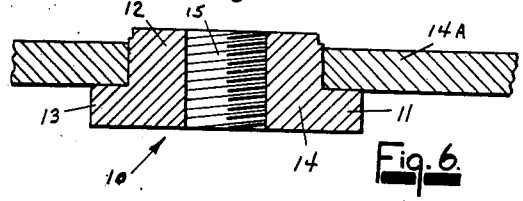
INVENTOR.
PLUMMER E. DOUBLE
BY Edward M. Apple
ATTORNEY.

Patented Dec. 19, 1939

2,183,641

UNITED STATES PATENT OFFICE 2,183,641

METHOD OF ATTACHING CLINCH NUTS

Plummer E. Double, Detroit, Mich.

Original application May 26, 1936, Serial No. 81,887, now Patent No. 2,110,039, dated March 1, 1938. Divided and this application January 12, 1938, Serial No. 184,579

2 Claims. (Cl. 29—148)

This invention relates to clinch nuts and particularly to a method of attaching to sheet steel and the like, clinch nuts, such as disclosed in my Patent No. 2,110,039, issued March 1, 1938, of which this application is a division.

An object of the invention is the provision of a novel method of attaching clinch nuts to sheet steel and the like, whereby the clinch nut will have positive locking means which will obviate the possibility of looseness developing after the clinching operation.

Another object of the invention is the provision of a method of attaching clinch nuts so that any possibility of damaging the threads in the clinching operation is eliminated.

Another object of the invention is the provision of a method of attaching clinch nuts which automatically takes care of any variations in the thickness of the metal to which the nuts are to be attached.

The foregoing as well as other advantages will be made more apparent as the description proceeds, reference being made to the accompanying drawing wherein:

Fig. 1 is a perspective view of my improved clinch nut which I propose to use in carrying out my novel method.

Fig. 2 is a sectional view taken on the line 2—2 of Fig. 1.

Fig. 3 is a perspective view showing how the nut may be attached to a piece of metal by my improved method.

Fig. 4 is a fragmentary view of the tool used to shear and expand portions of the nut in my improved method of attaching.

Fig. 5 is a section taken on line 5—5 of Fig. 3.

Fig. 6 is a section taken on line 6—6 of Fig. 3.

I am familiar with the various types of clinch nuts now available to the trade and the various methods used to secure them to other members. Many disadvantages have been encountered in using the common forms of nuts now on the market. It has been my experience that screw machine, cold-headed and caged type nuts are quite expensive to manufacture and difficult to lock or clinch properly. By my improved method of attaching clinch nuts I have obviated the difficulties encountered in the methods heretofore used and have provided a method of attaching which is positive and free from any possibility of the nuts becoming shaken loose.

In the drawing, I have disclosed the type of nut which I prefer to utilize in carrying out my invention and have illustrated the method of attachment which comprises the within invention.

In the drawing, 10 generally indicates the preferred form of clinch nut which I utilize in the carrying out of my invention. This nut comprises a collar portion 11 and the body portion 12. The body portion 12 is preferably square in shape to enable it to be readily inserted in a square hole in the metal. Time in assembling is saved as the nut can be placed in the hole either way without any fumbling as is often the case when the present known methods are employed. It is not intended, however, to limit the application of my method to square nuts as other forms of nuts may be readily employed with equal success.

The collar portion 11 is formed on the lower part of the nut, and in the embodiment shown comprises two laterally extending flanges 13 and 14, which provide means for preventing the nut from being disengaged from the metal 14a (Fig. 3) in one direction. Disengagement in the other direction is prevented by shearing and clinching, as hereinafter described in detail. A tapped hole 15 is formed through the center of the nut and provides means for receiving and holding the bolt or screw which is used in cooperation with the nut in the asembling of parts.

I have found my improved method as being highly desirable in fastening together various parts of automobiles and other objects where great difficulty is encountered in assembling numerous parts because of the inaccessibility of certain of the parts. In many instances ordinary means of fastening are useless since they cannot be applied with any degree of efficiency or speed. The use of my improved method of attaching these clinch nuts obviates such difficulties inasmuch as the nuts may be firmly attached to one of the parts before assembly and will be in place to receive the bolts when assembling the several parts.

In Fig. 4, I have shown a fragmentary view of a tool which may be employed to clinch the nuts. This tool is intended to be used in a machine adapted to apply considerable force and to automatically perform the shearing and clinching operation hereinafter described, but only enough of the mechanism is illustrated to enable the principle of its operation to be understood.

The tool 16 hereinabove mentioned comprises a cylindrical body portion 17 having a circular hole 18 formed therein at its lower extremity. The diameter of the hole 18 is smaller than the width of the nut by a predetermined amount and its edges are adapted to cut into and shear the top surface of the nut 10 as shown in Figs. 3, 5 and 6. The lower surface of the clinching device 16 is sloped upwardly as at 19, Fig. 4, to cause the sheared metal in the top of the nut 10 to be forced outwardly towards the sides and corners of the hole in the metal 14a to which the nut is being attached. This function is illustrated at 20, Figs. 3 and 5, and it can be easily seen that the nut is forced or jammed into the hole in such a manner that it is held firmly therein. It will not develop looseness after the clinching operation, but is permanently secured to the metal 14a.

Although it is desirable to utilize a size of hole in the clinching device 16 slightly smaller than the width of the nut, as hereinabove stated, it is not essential to the successful clinching of the nut, since the nut 10 could be clinched by a device having a hole larger than the width of the nut. In this instance, however, the nut would be sheared and jammed against the sides of the hole in the metal 14a in the corners only, and for this reason the first-named size is to be preferred.

My improved method of attaching clinch nuts has great utility, in that variations in the thickness of the metal to which it is to be attached do not prevent its functioning. Likewise the thickness of the nut may vary over a wide range without affecting the operation. These important advantages are made posible by the fact that the clinching of the nut may occur with only a small degree of shearing or with a deep shearing action if the head or top of the nut extends a greater amount above the top of the metal 14a. No adjustment is necessary to allow for this variation since the clinching device 16 and its associated mechanism automatically compensate for any set of conditions, thereby assuring substantially uniform results at all times. Furthermore, this feature permits the use of spacer nuts of varying thicknesses without changing the clinching set-up in any way.

In practicing my improved method I am enabled to utilize the entire thickness of the nut for tapping thereby presenting a much greater thread area than is possible in the old practice. It is obvious, therefore, that a much stronger fastening means is provided when the nuts are secured by my improved method.

In addition to the manifold advantages as brought out in the preceding description, the commercial value of my improved method is enhanced by reason of the fact that I effect a substantial saving by using the type of nuts disclosed in the drawing. The old style nuts were wasteful of material and usually required special machinery in their manufacture. On the other hand, the nuts which I employ may be formed with standard machines now in use and with a minimum of operations. This eliminates the necessity of large initial outlay for machinery and effects great savings in that it permits an increase in the rate of production and simplifies the operations necessary to effect the desired results.

From the foregoing it will be seen that I have disclosed a method of attaching clinch nuts which has many advantages over the prior art.

Having described my invention, what I claim and desire to secure by Letters Patent is:

1. The method of attaching a flat sided flanged nut to a plate-like member which consists of perforating said plate with an aperture adapted to receive the body of said nut, extending the body of the nut through said aperture, pressing the inner sides of the laterally extending flanges against the said plate-like member, and then slightly expanding the flat sides of the nut and simultaneously expanding the corners of the nut and aperture to permanently secure the parts together.

2. The method of attaching a flanged nut to a plate-like member which consists of perforating said plate with an aperture adapted to engage the body of said nut, extending the body of the nut through said aperture, pressing the inner sides of the laterally extending flanges against the said plate-like member, and then outwardly displacing a substantial portion of the body of said nut without disturbing the inner walls of said body, and slightly expanding the sides of the nut and simultaneously expanding the corners of the nut and the aperture to permanently secure the parts together.

PLUMMER E. DOUBLE.